United States Patent [19]

Buchstaller

[11] 3,773,280
[45] Nov. 20, 1973

[54] JET DEFLECTING DEVICE

[75] Inventor: Anton Buchstaller, Friedrichshafen, Germany

[73] Assignee: Dornier A.G., Friedrichshafen/Bodensee, Germany

[22] Filed: Oct. 27, 1971

[21] Appl. No.: 193,094

[30] Foreign Application Priority Data
Dec. 23, 1970 Germany.................. P 20 63 342.5

[52] U.S. Cl................ 244/56, 244/12 A, 244/23 A, 239/265.35
[51] Int. Cl............................................. B64d 27/18
[58] Field of Search..................... 244/53 R, 54, 55, 244/56, 23 A, 23 D, 12 A, 12 D; 239/265.11, 265.19, 265.23, 265.33, 265.37, 265.39, 265.41, 265.43, 588, 265.35; 60/226 R, 200 R, 228, 232; 138/118–120, 121, 134; 115/12 R

[56] References Cited
UNITED STATES PATENTS

| 3,380,660 | 4/1968 | Markowski | 239/265.19 |
| 3,184,917 | 5/1965 | Coovette et al. | 239/265.35 X |
| 3,178,887 | 4/1965 | Wilde et al. | 244/23 D |
| 3,259,405 | 7/1966 | Heller | 138/121 X |
| 2,608,820 | 9/1952 | Berliner | 138/121 X |
| 2,891,740 | 6/1959 | Campbell | 244/12 D |
| 3,003,312 | 10/1961 | Jewell | 239/265.35 |
| 3,266,244 | 8/1966 | Schulze et al. | 239/265.35 |
| 3,290,887 | 12/1966 | Poole | 239/265.35 |

Primary Examiner—George E. A. Halvosa
Assistant Examiner—E. R. Kazenske
Attorney—James E. Bryan

[57] ABSTRACT

This invention relates to a jet deflecting device, particularly adapted for deflecting the propellent gas jet of an aircraft jet engine, which comprises pivot bearing means connecting the jet discharge nozzle with a stationary part of the jet engine, and extensible tubular means connected between said nozzle and said stationary part, said tubular means being variable in curvature in correspondence with the nozzle pivoting movement and having a transitional jet guiding surface between said nozzle and said stationary part.

6 Claims, 7 Drawing Figures

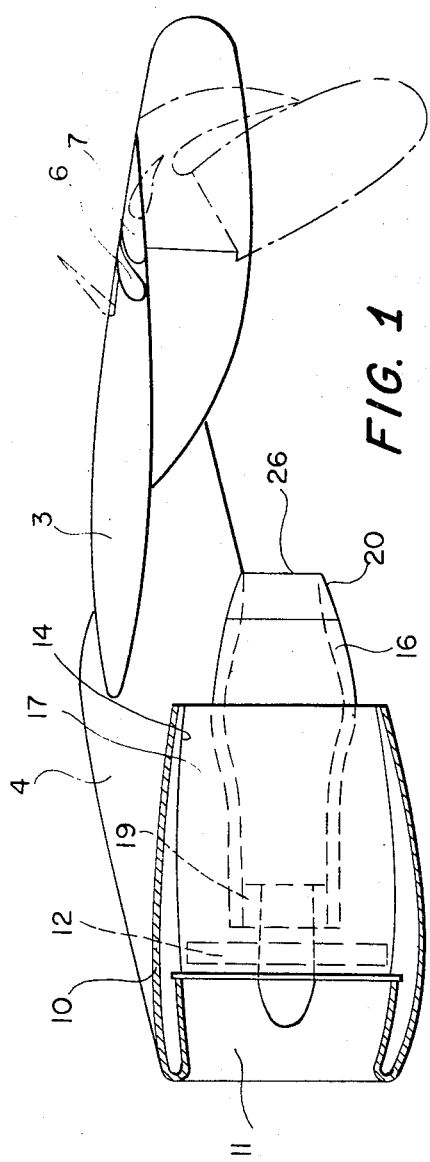
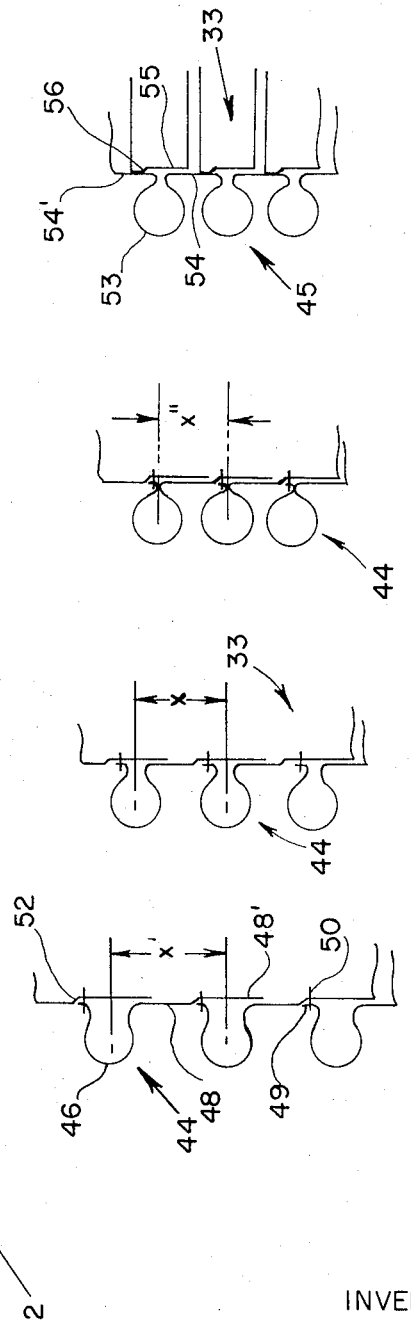
INVENTOR
ANTON BUCHSTALLER
ATTORNEY

INVENTOR
ANTON BUCHSTALLER

ATTORNEY

JET DEFLECTING DEVICE

The present invention relates to a jet deflecting device or system, designed particularly for deflecting the propellent gas jets of jet engines in aircraft, wherein the jet discharge nozzle is mounted — by way of pivot bearing supports — at the stationary jet guiding part of the propulsion unit.

In certain airplane configurations it is required that the propellent gas jets of propulsion engines be deflected from the discharge direction thereof in the direction toward the slotted flaps at the trailing wing edge in order that the short take-off and landing properties be improved. It is possible to achieve therewith both a jet component furnishing lift, and an increase of the lifting power aerodynamically during slow flight, i.e. during take-off and landing.

In aircraft having vertical flight properties with the aid of jet lift engines, it is customary to deflect the propellent gas jet discharging from the jet lift engines by a specific angular value from the discharging direction and to thereby produce braking thrust. It is known to arrange for this purpose deflector vanes in the area of the discharge nozzle, these vanes being so mounted as to be adapted to be pivoted into the propellent gas jet.

Another prior art arrangement provides for a flexible jet discharge tube consisting of a eries of movable rings which are conically tapered and which partially overlap each other. The manufacture of such flexible tube parts is complicated, and furthermore the problem of sealing is difficult. This known arrangement results in a considerable elongation of the entire propulsion unit design, which fact becomes noticeable unfavorably, particularly with the use thereof in lift engines. In addition thereto, significant resistances to flow are produced in the afore-mentioned flexible tube parts as the transitions between the adjacent ring parts.

The present invention provides a jet deflecting device or system which assures in all deflecting positions a constant guide of the discharging gas jet and a flawless sealing of the jet guide, while the flow resistances are kept as small as possible.

This is attained, in accordance with the present invention, by virtue of the fact that connected with the jet outlet or discharge nozzle and the stationary jet guide is a tube part which is adapted to be varied in the curvature thereof according to the degree of the nozzle pivoting and which has a transitional jet guiding surface from the jet guiding surface of the stationary jet guide and the inner propulsion unit cowl or sheathing, to the jet guiding surface of the jet nozzle.

A jet deflecting device designed and constructed in this manner is extremely simple in the construction thereof. Achieved furthermore is a faultless constant jet guide or guidance in all of the deflecting positions and also in the neutral position, i.e. in the position in which no deflection takes place. In all of the positions of the nozzle, any impairment of the discharging propellent gas jet by means of projections extending into the flow or any recesses interrupting the jet guiding surface are largely eliminated. The tubular part which is inserted within the stationary jet guide and the jet discharge nozzle serves therein only for forming a transitional jet guiding surface. The bearing support of the pivotal jet discharge nozzle is arranged directly at the stationary jet guiding part.

A further embodiment of the present invention proposes that the tubular part be constructed in a manner known per se like an undulated and folded tubular portion. This assures particularly also in the neutral position of the jet discharge nozzle, i.e. when the propellent gas jet of the propulsion unit is not intended to be deflected, an almost gap-free transition of the outer contour of the stationary jet guide to the outer contour of the jet discharge nozzle. This construction avoids an increase of the aerodynamic drag, as well as a disturbance of the bypass flow when a bypass type engine is used. The result is an outer contour being closed toward the outside in any position of the jet discharge nozzle, while the internally positioned folding and, undulating tubular part allows for a constant guide of the propellent gas jet independently of the position of the pivotal jet discharge nozzle.

In order to be able to achieve a guide of the propellent gas jet within the folding and/or corrugated tubular part which is as low in resistance as possible, the annular gaps formed by reason of the profiling of the tubular part are positioned at the inner surface of the folding and/or corrugated tubular part as annular plates overlapping in any position of the jet discharge nozzle. The annular plates thus form the transitional jet guiding surface which adapts in its curvature to the respective deflecting position of the jet discharge nozzle and brings about a constant guide to the propellent gas jet from the stationary jet guiding portion to the jet discharge nozzle.

One embodiment of the present invention is illustrated in the accompanying drawings, wherein FIG. 1 is a general view of a jet engine mounted below a wing and in a side view thereof;

FIGS. 4 to 6 illustrate, in a portion taken from FIGS. 2 and 3, respectively, and shown at an enlarged scale, details of the pivot nozzle, and FIG. 7 schematically illustrates a further design of the folding and/or corrugated tubular part in a longitudinal cross-sectional view thereof.

Figure 2:
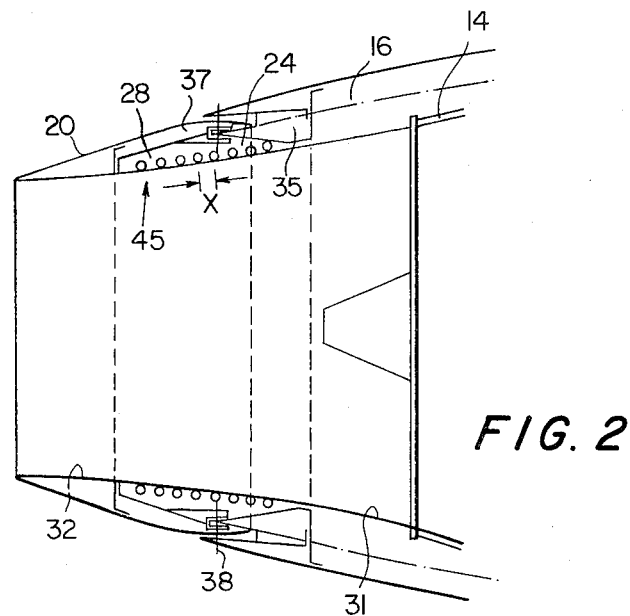
FIG. 2 illustrates, in a portion taken from FIG. 1 and shown at an enlarged scale, the pivot nozzle in the normal position and in a longitudinal cross-sectional view thereof.

The drawing shows the wing of an aircraft together with bypass type engines being mounted on both sides of the airplane fuselage and secured below the wing by struts.

In FIG. 1, one of the bypass engines has been identified with reference numeral 2 and the airplane wing has been designated with reference numeral 3. The bypass engines 2 are mounted below the wing in the area of the leading wing edge with the aid of the supporting struts 4. Mounted at the trailing edge of the wing 3 and the double slotted flaps 6 and 7, respectively, which are utilized for purposes of increasing the lift during take-off and landing. Reference numeral 10 further identifies the cowling forming the engine nacelles. Positioned within the front portion of the cowling 10 is the air inlet opening 11, and positioned therebehind are the compressor vanes 12 of the single-stage low-pressure compressor. The bypass flow channel 17 is formed by means of the outer engine or power unit cowling 14 and the inner engine or power unit cowling 15. The air supply channel 9 which is positioned concentrically with respect to the bypass flow channel 17 passes or guides a portion of the air furnished by the low pressure compressor to the high pressure compressor and to the combustion chambers and, also, to the turbine from which the propellent gas jets are fed to the jet discharge or outlet nozzle 20; the elements of the engine or power unit referred to herein have not been illustrated.

Figure 3:
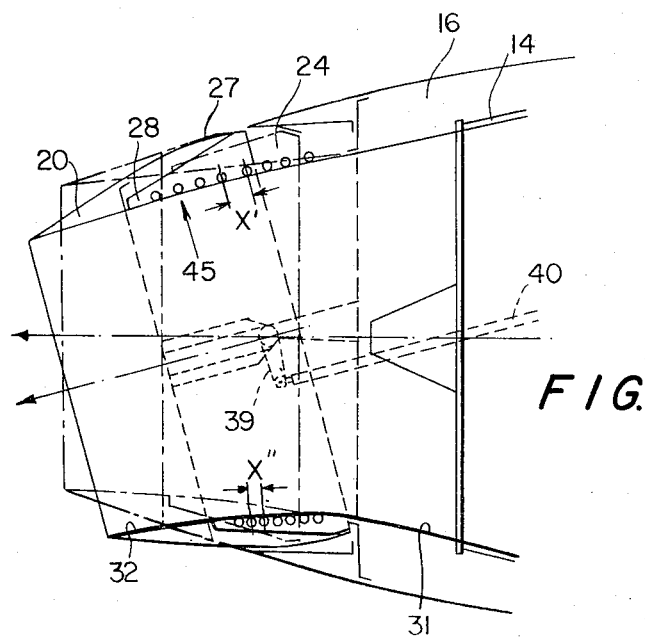
FIG. 3 illustrates, in a portion taken from FIG. 1 and shown at an enlarged scale, the pivot nozzle in a pivoted position and in a longitudinal cross-sectional view thereof.

As is apparent particularly from FIGS. 2 and 3, the jet discharge nozzle 20 is herein mounted separately from the stationary jet guide formed by the inner engine or power unit cowling 16. The jet discharge nozzle 20 engages over a part of its longitudinal extension in an annular recess 24 in the area of the free end of the inner engine or power unit cowling 16. The section of the jet discharge nozzle 20 which engages in the recess 24 has a peripheral area or surface 27 in the form of a spherical segment by means of which latter a pivoting movement of the nozzle 20 within the recess 24 of the jet guide is rendered possible. An annular recess 28 is machined into the jet guiding surface 32 extending to the jet discharge opening 26 (FIG. 1) of the nozzle 20. The jet discharge nozzle 20 further has forked portions 37 in which engage corresponding pivot bearing parts 35 at the inner engine cowling 16. The forked portions 37 of the jet discharge nozzle 20 and the pivot bearing parts 35 of the stationary jet guide 16 are hingedly connected with each other by way of pivot bearing bolts 38 being coaxially arranged with respect to each other so that the jet discharge nozzle 20 is adapted to execute a pivoting movement about the axes being positioned parallel to the transverse airplane axis. Coupled to the pivot bolts 38 are rocking levers 39 which are connected to a drive mechanism, not shown, by way of a linkage system 40 on both sides of the inner engine cowling 16. Inserted within the annular recess 24 of the inner engine cowling 16 and the annular recess 28 at the jet discharge nozzle 20 is a folding and/or corrugated tubular part 45 which serves as hinge expansion compensating means.

As is apparent from FIGS. 4 to 6 respectively, the tubular part 45 consists in this construction of individual profiled elements 44 which are composed in each case of an annular profiled section 46 having a lyre-like cross-section, and adjacent cylindrical or cylinder-like sections 48 and/or 49. The cylinder-shaped section 48 of the profiled elements 44 overlaps in every pivoting position of the jet discharge nozzle 20 the cylindrical section 49 and the section 48 of the adjacent profiled element 44, and covers at the same time also the annular opening which points toward the jet guide and is formed by the lyre-like annular profiled section 46. Two adjacent profiled elements 44 each are connected to each other with the cylindrical sections 48 and 49 thereof by way of a connection 50, whicy may be made by spot-welding. The cylindrical sections 48 have on a portion of the longitudinal extension thereof a step 52 and the set-off portion has been designated with reference numeral 48'. The cylindrical sections 48' are thus positioned on the same diameter. Accordingly, the cylindrical sections 48, 48' of the profiled elements 44 constitute a transitional jet guiding surface 33 between the jet guiding surface 31 of the inner engine cowling 16 and the jet guiding surface 32 of the jet discharge nozzle 20 (FIGS. 2 and 3).

The operation of the construction described hereinabove according to FIGS. 1 to 6 is as follows -

If it is intended that a deflection of the primary jet being guided through the jet discharge nozzle 20 be made from the outlet direction toward the rear in the direction toward the double slotted flaps 6 and 7, the jet discharge nozzle 20 is moved by way of the linkage system 40 and the rocking levers 39 about the pivot bearing bolts 38. At that time there takes place due to the connection of the tubular part 45 on the one hand with the stationary jet guide 16 and, on the other hand, with the jet discharge nozzle 20, a corresponding curvature of the tubular part 45, and the contraction in length of the tubular part 45 above the pivot bearing bolts 38, and the lengthening thereof below the bolts 38 with respect to the normal position will be absorbed by the lyre-like annular profiled sections 46. Thus there will be produced between two annular profiled elements each a distance variation $x'$ and/or $x''$ as compared to the normal distance $x$. Due to the fact that the cylindrical tube-shaped section 48, 48' of each annular profiled element 44 overlaps the annular opening of the lyre-like annular profiled section 46 and the cylinder-shaped section 48 of the adjacent annular profiled element 44, a transitional jet guiding surface 33 is formed through which the propellent gas jet is constantly guided, even in the pivoted position of the jet discharge nozzle 20, by the stationary jet guide 16 to the jet nozzle 20. The adjustment or adaptation of the cylinder-shaped sections 48, 48' to the curvature of the annular profiled elements 44 is brought about by the unilateral connection of these sections 48, 48' with the adjacent cylinder-like section 49 of the annular profiled elements 44.

FIG. 7 illustrates a further embodiment of a folding and/or corrugated tubular part 45. In this construction, the connection between the stationary jet guide 16 and the jet discharge nozzle 20 is established by way of a corrugated tube, made in one piece, having a lyre-like annular profile section 53 and cylindrical sections 54 and/or 54'. Rigidly coupled to the section 54' of each lyre-like annular profile section 53 via a connection 56 is a cylindrical part 55 which will in each case overlap the annular opening of the lyre-like annular profile section 53 and the adjacent cylindrical section 54 in any pivoted position of the jet discharge nozzle 20. The cylindrical portion forms therein the transitional jet guiding surface 33 from the stationary jet guide 16 to the jet discharge nozzle 20.

It will be obvious to those skilled in the art that many modifications may be made within the scope of the present invention without departing from the spirit thereof, and the invention includes all such modifications.

What is claimed is:

1. A jet deflecting device, particularly adapted to deflect the propellent gas jet of an aircraft engine, which comprises a jet nozzle pivotally mounted on a stationary portion of a jet engine and having an outer surface, adjacent said jet engine, formed as a spherical segment positioned within a recess formed in the outer sheathing of said jet engine and said nozzle having a curvature and a sufficient length to form a substantially smooth outer contour from said jet engine in any pivotal position of said nozzle; a recess in said nozzle adjacent said recess and a corrugated section mounted within said recesses in said jet engine and said nozzle, having one end thereof attached to said jet engine and the other end thereof attached to said nozzle and the openings of the ridges of said corrugated section facing inwardly; and cover means covering said openings and having a length sufficient to form a substantially smooth inner contour between said jet engine and said nozzle in any pivotal position of said nozzle.

2. A jet deflecting device according to claim 1 wherein the corrugated section has a constant degree of extension and contraction along its length.

3. A jet deflecting device according to claim 1 wherein the ridges of the corrugated section are folded at the openings of said ridges to form ridges of cylindrical cross-section.

4. A jet deflecting device according to claim 1 wherein the cover means includes a separate cover for each of the openings of the ridges of the corrugated section which are formed as an integral part of the next adjacent ridge of said corrugated section.

5. A jet deflecting device according to claim 4 wherein each cover is fixedly attached to the corrugated section adjacent one side of the opening of the ridge, is stepped inwardly and then extends longitudinally at a constant diameter to a point beyond the other side of said opening of said ridge.

6. A jet deflecting device according to claim 1 wherein the corrugated section is formed as a single piece and the cover means includes a separately formed cover for each of the openings of the ridges of the corrugated section and has one end thereof attached to the groove portion connecting two of the ridges of the corrugated section and terminates at a point beyond the opening of one of said two ridges.

* * * * *